(12) United States Patent
Valentin et al.

(10) Patent No.: US 9,231,746 B2
(45) Date of Patent: Jan. 5, 2016

(54) METHOD AND TRANSMITTER ELEMENT FOR TRANSMITTING CHANNEL INFORMATION FOR LINK ADAPTATION, METHOD AND RECEIVER ELEMENT FOR RECEIVING THE CHANNEL INFORMATION

(75) Inventors: Stefan Valentin, Stuttgart (DE); Thorsten Wild, Stuttgart (DE); Andre F. D. Santos, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 150 days.

(21) Appl. No.: 13/980,423

(22) PCT Filed: Dec. 16, 2011

(86) PCT No.: PCT/EP2011/073059
§ 371 (c)(1),
(2), (4) Date: Jul. 18, 2013

(87) PCT Pub. No.: WO2012/097935
PCT Pub. Date: Jul. 26, 2012

(65) Prior Publication Data
US 2013/0301599 A1 Nov. 14, 2013

(30) Foreign Application Priority Data
Jan. 21, 2011 (EP) .................................... 11290037

(51) Int. Cl.
*H04W 4/00* (2009.01)
*H04L 5/00* (2006.01)
*H04L 1/00* (2006.01)

(52) U.S. Cl.
CPC .............. *H04L 5/0057* (2013.01); *H04L 1/007* (2013.01); *H04L 1/0026* (2013.01)

(58) Field of Classification Search
CPC ...... H04L 5/0057; H04L 1/0026; H04L 1/007
See application file for complete search history.

(56) References Cited

U.S. PATENT DOCUMENTS

| 8,891,661 B2 * | 11/2014 | Seier et al. ..................... 375/269 |
| 2003/0100267 A1 * | 5/2003 | Itoh et al. ......................... 455/69 |

(Continued)

FOREIGN PATENT DOCUMENTS

| CN | 101331700 A | 12/2008 |
| CN | 101594198 A | 12/2009 |

(Continued)

OTHER PUBLICATIONS

Japanese Office Action dated Sep. 25, 2014 (English Translation attached).

(Continued)

*Primary Examiner* — Robert Wilson
(74) *Attorney, Agent, or Firm* — Fay Sharpe LLP

(57) ABSTRACT

The present invention refers to a method and a transmitter element (35) for transmitting channel information (CI) for link adaptation of a radio channel (33) in a wireless network (11). In order to allow for reliable and efficient transfer of the channel information (CI) and to adapt the detection probability to the importance of the CI as well as to the channel stability, it is suggested that the method comprises encoding (19) the channel information (CI) using multi-level coding, said multi-level coding (19) comprising combining multiple bit sequences (c1, c2, . . . , cn, d), each bit sequence (c1, c2, . . . , cn, d) corresponding to a coding level (1, . . . , n) of said multilevel coding (19) and assigning (37) one of said coding levels (1, . . . , n) to at least a part (ci1, ci2) of the channel information (CI) such that at least a part (ci1, ci2) of the channel information (CI) corresponds to the bit sequence (c1, c2, . . . , cn) of that coding level (1, . . . , n). Furthermore, the present invention refers to a method and a receiver element for receiving the transmitted channel information (CI).

12 Claims, 4 Drawing Sheets

| 11 | operating network |
| 13 | terminal |
| 17 | transceiver |
| 31 | transmission line |
| 21 | transmitter |
| s | signal generated by the encoder 19 |
| c | codeword generated by the encoder 19 |
| d | data sequence |
| CI | channel information |
| 19 | encoder |
| 33 | radio channel |
| 29 | radio channel |
| 15 | base station |
| 25 | receiver |
| s' | received signal received by the receiver 25 |
| c' | received code word to the decoder 27 |
| 27 | decoder |
| d' | regenerated data sequence |
| CI' | regenerated channel information |
| 23 | transceiver |

(56) References Cited

U.S. PATENT DOCUMENTS

| | | | |
|---|---|---|---|
| 2004/0062318 A1* | 4/2004 | Yu et al. | 375/264 |
| 2006/0026491 A1* | 2/2006 | Shoemake et al. | 714/776 |
| 2007/0019753 A1* | 1/2007 | Kim | 375/260 |
| 2007/0141994 A1 | 6/2007 | Cheng | |
| 2009/0199055 A1* | 8/2009 | Chen et al. | 714/701 |
| 2011/0091893 A1* | 4/2011 | Heyduk et al. | 435/6 |
| 2011/0255467 A1* | 10/2011 | Larsson | 370/328 |
| 2013/0301599 A1* | 11/2013 | Valentin et al. | 370/329 |

FOREIGN PATENT DOCUMENTS

| | | |
|---|---|---|
| JP | 2010-507326 | 3/2010 |
| JP | 2010-529789 | 8/2010 |
| WO | WO 2008/048188 | 4/2008 |
| WO | WO 2008/154506 | 12/2008 |
| WO | WO 2010/042235 | 4/2010 |

OTHER PUBLICATIONS

InterDigital, "FEC Coding of type-B CQI / PI information," $3^{rd}$ Generation Partnership Project (3GPP), 3GPP TSG RAN WG1 Meeting #47bis, R1-070493, XP050104523, 3 pages, Sorrento, Italy, Jan. 15-19, 2007.

International Search Report for PCT/EP2011/073059 dated Jun. 14, 2012.

* cited by examiner

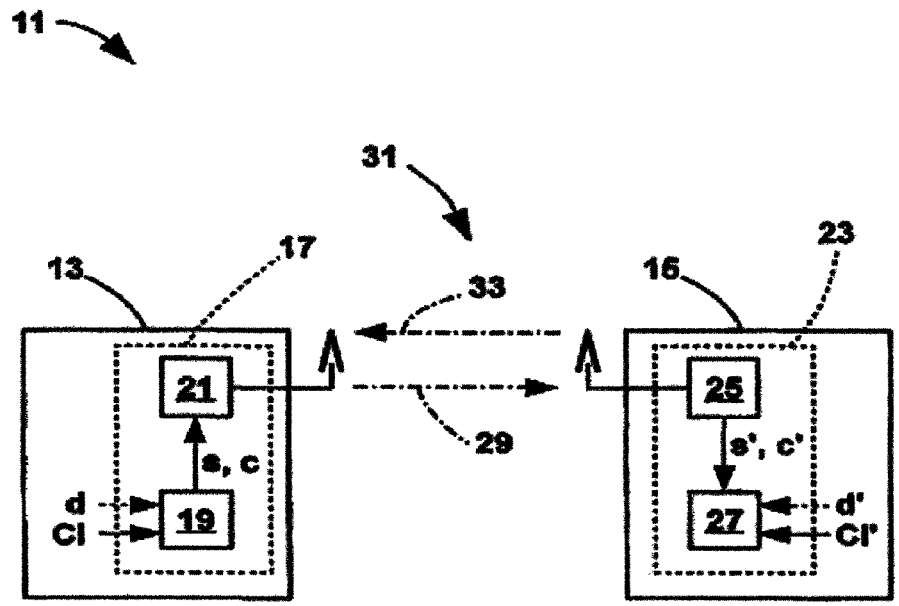

| 11 | operating network |
|----|---|
| 13 | terminal |
| 17 | transceiver |
| 31 | transmission line |
| 21 | transmitter |
| s | signal generated by the encoder 19 |
| c | codeword generated by the encoder 19 |
| d | data sequence |
| CI | channel information |
| 19 | encoder |
| 33 | radio channel |
| 29 | radio channel |
| 15 | base station |
| 25 | receiver |
| s' | received signal received by the receiver 25 |
| c' | received code word to the decoder 27 |
| 27 | decoder |
| d' | regenerated data sequence |
| CI' | regenerated channel information |
| 23 | transceiver |

Fig. 1

| 31 | transmission line |
|---|---|
| 35 | transmitter element |
| CI | channel information |
| $ci_1, ci_2$ | channel information subparts |
| d | data sequence |
| 37 | prioritizing element |
| $c_1, c_2, c_n$ | bit sequences |
| $p_1, p_2, p_n$ | probability levels |
| 19 | encoder |
| 39 | mapper |
| m | mapping information generated by the mapper 39 |
| 29 | radio channel |
| 27 | decoder |
| 41 | receiver element |

| 43 | outer symbols |
| 45 | inner symbols |
| $c_1, c_2$ | bit sequences |

| 53 | complex hypersphere |
| 55 | differential vectors |
| 59 | spherical cap |
| 55a | selected differential vector |
| 51 | precoding vectors |
| 51a | coarse precoding vector |
| 57 | precoding vector |

METHOD AND TRANSMITTER ELEMENT FOR TRANSMITTING CHANNEL INFORMATION FOR LINK ADAPTATION, METHOD AND RECEIVER ELEMENT FOR RECEIVING THE CHANNEL INFORMATION

FIELD OF THE INVENTION

The present invention refers to a method and a transmitter element for transmitting channel information for link adaptation of a radio channel in a wireless network. Furthermore, the present invention refers to a method and a receiver element for receiving the channel information.

BACKGROUND

Base stations of cellular communication networks known in the art are arranged for adapting a transmission mode for data transmission to a particular mobile terminal registered with that base station, with this adaptation depending on a current state of a radio channel between the base station and the terminal. Adapting the data transmission to the state of the channel is often referred to as link adaptation.

It is known to transfer channel information describing the current state of the radio channel from the individual terminals to the base station. However this transfer of channel information consumes transmission resources. Moreover, transmission errors may occur when transferring the channel information to the base station, which may lead to a mismatch between the actual channel state and the channel state represented by the channel information received by the base station.

SUMMARY

The object of the present invention is to provide methods for transmitting and receiving the channel information as well as a transmitter element and a receiver element that allow for reliably and efficiently transfer the channel information between different network nodes, such as a terminal and a base station, of a wireless network.

According to an embodiment of the present invention, a method for transmitting channel information for link adaptation of a radio channel in a wireless network is provided, the method comprising encoding the channel information using multi-level coding, said multi-level coding comprising combining multiple bit sequences, each bit sequence corresponding to a coding level of said multi-level coding and assigning one of said coding levels to at least a part of the channel information such that the at least a part of the channel information corresponds to the bit sequence of that coding level.

The method can be applied to any type of wireless networks. For example, the wireless network may be a cellular network such as the Universal Mobile Telecommunication System (UMTS), the Long Term Evolution (LTE) system, the LTE-Advanced system, or the Worldwide Interoperability for Microwave Access (WiMAX) system or a non-cellular network such as Wireless Local Area Networks (WLANs) or Wireless Sensor Networks (WSNs) following the IEEE 802.11 or 802.15 standard family, respectively.

The channel information describes momentary characteristics of the channel. In LTE, the channel information is also referred to as Channel State Information (CSI). The channel information may comprise Channel Quality Indicator (CQI). In LTE, the terminal estimates the quality of the channel, determines the CQI depending on the estimated quality, and transmits the CQI to the base station. Furthermore, the channel information may comprise a Precoding Matrix Indicator (PMI). The terminal may communicate the PMI to the base station. The base station may determine precoding weights or a precoding matrix depending on the PMI received from the terminal and adapt downlink data transmissions to that terminal according to the precoding weights or precoding matrix. A similar procedure is needed in any wireless system when reciprocal wireless channels cannot be assumed.

Preferably, each coding level corresponds to a level of a detection probability of the bit sequence of that coding level. The detection probability is the probability that the bit sequence is correctly detected by a receiver, provided that transmission errors may occur when transmitting the channel information over the radio channel. The method may be executed by a terminal of the wireless network, i.e. the method may be a method for operating a terminal of the wireless network.

Assigning the at least a part of the channel information to the predefined coding level allows for controlling the detection probability, i.e. a quality of the transmission of the channel information. Choosing an appropriate coding level therefore reduces the risk of distorting the channel information while transferring it, e.g. from a terminal of the network to a base station of the network, and thus improves the reliability of the transmission of the channel information. Choosing an appropriate coding level also allows to prioritise channel information of different relevance. For instance, a robust coding level (i.e., high detection rate) can be assigned to essential channel information while a less-robust coding level is chosen for channel information that is less important.

In an embodiment, the method comprises classifying the channel information by subdividing it into multiple parts of channel information according to an importance of these parts of channel information for the link adaptation and assigning one of said coding levels to at least one part of said multiple parts. Said multiple parts may differ from each other regarding their importance with respect to link adaptation. For instance, a part of the link information that is important for the link adaptation to work correctly may be assigned to a coding level having a rather high detection probability. This part of the channel information will be transmitted very reliably. The important part of the channel information being transmitted reliably leads to a reliable link adaptation.

Preferably, the method comprises assigning multiple coding levels to multiple parts of the channel information, a detection probability of the coding level assigned to at least one of said multiple parts being higher than the detection probability of the coding level assigned to any further part of said multiple parts having a lower importance with respect to link adaptation than said at least one part. In other words, the parts of the channel information are prioritised by assigning to them different coding levels having different detection probability levels. Important parts have a high detection probability and can be regenerated by a receiver even in case of high noise or strong interference on the radio channel. Less important parts have a lower detection probability than the important parts. Consequently, a receiver may not be able to detect the less important parts in all situations. However, transmitting the less important parts using a coding level with lower detection probability consumes less transmission resources and still improves the overall channel information in many cases. Following this so-called "best effort" principle, the important parts of the channel information can be transmitted reliably without affecting the efficiency of the transmission of the whole channel information.

In one embodiment, the at least one coding level is assigned statically to at least one part of channel information. However, in another embodiment, the at least one coding level is assigned dynamically to the at least one part of channel information according to a momentary importance of these parts of channel information for the link adaptation.

Dynamic assignments mean that the assignment of the coding level is automatically changed during the operation of the wireless network. Such dynamic changes may be performed at different time-scale depending on how the importance of the parts of the channel information is signalled. This can be done at different layers of control signalling, e.g. MAC-layer control signalling or Radio link control signalling.

Static assignments mean that the importance is temporarily constant. Changes can be made e.g. via setting operation and maintenance parameters of the network.

In an embodiment, a first part of said multiple parts of channel information comprises wideband information related to the whole radio channel and a second part of said multiple parts of channel information comprises sub-band information related to a sub-band of the radio channel, the first part is of higher importance for the link adaptation than the second part. Preferably, a coding level having a rather high detection probability level is assigned to the wideband information and a coding level having a rather low detection probability level is assigned to the sub-band information, said low detection probability level being less then the detection probability level assigned to the wideband information.

The importance of the wideband channel information compared to the importance of the sub-band channel information may be time-variant. For instance, when frequency-selective resource allocation is performed in a frequency-selective environment, the wideband channel information is less effective for link adaptation than the sub-band information. In such cases, a coding level having a higher detection probability may be dynamically assigned to sub-band information while wideband information receives a coding level of lower detection probability. When the user leaves the frequency-selective environment, its channel flattens. Then, the importance of sub-band channel information decreases. A dynamic embodiment of the invention may reflect this by reversing the above allocation of coding levels.

According to another embodiment, the channel information comprises coarse information and refining information for refining the coarse information, the coarse information corresponding to a part of said multiple parts of channel information that has a higher importance with respect to link adaptation than a further part of said multiple parts corresponding to the refining information. For instance, the coarse information is coarse precoding vector information that characterizes a coarse precoding vector and the refining information is refining precoding information for determining a fine-grained precoding vector based on the coarse precoding vector. The precoding vector may comprise preferred precoding weights used by a network element of the network, e.g. a base station, for precoding a signal to be transmitted over the radio channel. For instance, the coarse precoding vector information may be an index for selecting a preferred precoding vector stored in a predefined codebook having multiple precoding vectors.

In the previous embodiments, the method transmits channel information only. In another embodiment, the method comprises transmitting payload data using said multi-level coding and assigning different coding levels to the payload data and to the at least one part of the channel information. In other words, at least one coding level may be assigned to the payload and at least one different coding level may be assigned to the channel information. The payload data may correspond to one of said multiple bit sequences corresponding to a certain coding level. The payload data may be data received from higher protocol layers or to be forwarded to the higher protocol layer and/or control data unrelated to channel information. In an exemplary embodiment, a first coding level is assigned to the whole channel information and a second coding level is assigned to the payload information.

The assignment of the coding levels to the channel information and/or to the payload may be static. A coding level having a higher detection probability may be assigned to the channel information while a coding level with lower detection probability is assigned to the payload data. In situations where reliable transmission of the payload is more important than reliable transmission of the channel information, the coding level assigned to the channel information may have a lower detection probability than the coding level assigned to the payload data. This assignment may be reversed in situations where reliable transmission of the payload is less important than reliable transmission of the channel information.

Instead of statically assigning the coding levels to the bit sequences, e.g. the channel information and the payload data, in an embodiment, the coding levels are assigned dynamically to the payload data and to the at least a part of the channel information, i.e. the assignment of the coding level to the bit sequences is changed dynamically. This adaptation may be done with respect to the stability of the wireless channel. When the channel is temporally unstable (e.g., at high user speed) the channel information is highly time variant and, thus, of lower importance than with temporally stable channels. One embodiment may reflect this as follows. For fast users (i.e., unstable channels), at least one coding level with high detection probability is assigned to data while at least one coding level with lower detection rate is assigned to channel information. This assignment is reversed when the channel stability improves (e.g., with slower users).

In a preferred embodiment, the multi-level coding is a hierarchical modulation.

According to another preferred embodiment of the present invention, a method for receiving channel information for link adaptation of a radio channel in a wireless network is provided, the method comprising decoding the channel information using multi-level decoding, said multi-level decoding comprising detecting multiple bit sequences, each bit sequence corresponding to a coding level of said multi-level decoding and determining at least a part of the channel information depending on the bit sequence corresponding to a predefined coding level.

In an embodiment, the channel information is subdivided into multiple parts of channel information according to an importance of these parts of channel information for the link adaptation and a first part of said multiple parts of channel information comprises wideband information related to the whole radio channel and a second part of said multiple parts of channel information comprises sub-band information related to a sub-band of the radio channel, the first part having a higher importance with respect to link adaptation than the second part.

Preferably, the channel information is subdivided into multiple parts of channel information according to an importance of these parts of channel information for the link adaptation and wherein the channel information comprises coarse information, preferably coarse precoding vector information, and refining information for refining the coarse information that characterizes a coarse precoding vector, preferably refining precoding information for determining a fine-grained precoding vector based on the coarse precoding vector, the coarse information corresponding to a part of said multiple parts of channel information that has a higher importance with respect to the link adaptation than a further part of said multiple parts corresponding to the refining information.

In an embodiment, the method comprises receiving payload data using said multi-level coding, the payload data being assigned to a different coding level than the at least one part of the channel information.

According to yet another preferred embodiment of the present invention, a transmitter element for transmitting channel information for link adaptation of a radio channel of a wireless network is provided, the transmitter element being configured for encoding the channel information using multi-level coding, said multi-level coding comprising combining multiple bit sequences, each bit sequence corresponding to a coding level of said multi-level coding and assigning one of said coding levels to at least a part of the channel information such that the at least a part of the channel information corresponds to the bit sequence of that coding level.

Preferably, the transmitter is configured for executing a method for transmitting channel information according to the present invention.

According to still another preferred embodiment of the present invention, a receiver element for receiving channel information for link adaptation of a radio channel of a wireless network is provided, the receiver element being arranged for decoding the channel information using multi-level decoding, said multi-level decoding comprising detecting multiple bit sequences, each bit sequence corresponding to a coding level of said multi-level decoding and determining at least a part of the channel information depending on the bit sequence corresponding to a predefined coding level.

Preferably, the receiver element is configured for executing a method according to the present invention.

BRIEF DESCRIPTION OF THE FIGURES

Preferred embodiments and further advantages of the present invention are shown in the Figures and described in detail hereinafter.

FIG. 1 shows a wireless communication network comprising a terminal and base station;

DESCRIPTION OF THE EMBODIMENTS

Figure 2:
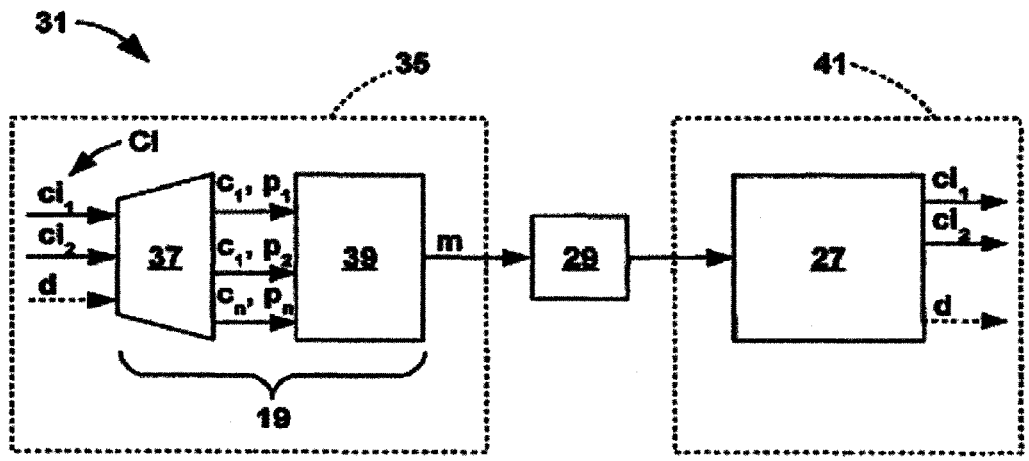
FIG. 2 shows a block diagram of a radio transmission line of the network of FIG. 1.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

FIG. 1 shows a wireless communication network 11 comprising a terminal 13 and a base station 15. In the shown embodiment, the network 11 is a LTE or LTE-Advanced communication system. In LTE or LTE-Advanced, the terminal is also referred to as User Equipment (UE) and the base station is also referred to as enhanced NodeB (eNodeB). However, the present invention is not limited to LTE or LTE-Advanced. In another embodiment, the network 11 is a part of an access network of UMTS or WiMAX or even a part of a WLAN or WSN.

The terminal 13 comprises a first transceiver 17 having a channel encoder and/or modulator 19, further referred to as encoder 19, and a transmitter 21, an output of the channel encoder 19 being connected to an input of the transmitter 21 and an output of the transmitter 21 being coupled with an antenna of the terminal 13.

The base station has a second transceiver 23 comprising a receiver 25 and a channel decoder and/or demodulator 27, further referred to as decoder 27. The receiver 25 is coupled with an antenna of the base station 15 and an output of the receiver 25 is connected to an input of the channel decoder 27.

The first transceiver, an uplink radio channel 29 and the second transceiver 23 are part of an uplink transmission line 31. The second transceiver 23 has a transmitter for transmitting over a downlink radio channel 33 to a receiver of the first transceiver 17. For the sake of simplicity, both the transmitter of the second transceiver 23 and the receiver of the first transceiver 17 are not shown.

When operating the network 11, channel information CI is encoded and/or modulated by the encoder 19. The encoder 19 generates a signal s that is transmitted over the uplink radio channel 29 by the transmitter 21. The signal s may comprise a codeword c generated by the encoder 19 and comprising the channel information CI. The receiver 25 receives the transmitted signal and forwards the received signal s' comprising a received codeword c' to the decoder 27. The decoder 27 regenerates the channel information CI.

The channel information CI is often referred to as Channel State Information (CSI). In LTE, the channel information may comprise a Precoding Matrix Indicator (PMI), which may have a size of 2 bits, and/or Channel Quality Information (CQI), which may have a size of 5 bits. The CQI typically not only contains a property of the radio channel (channel gain) but also the level of received noise and interference, so it is also related to the SINR (signal to interference plus noise ratio). The codeword c may have a size of about 1000 to 2000 bits. Here, the codeword c is transmitted over a radio frame comprising 14 Orthogonal Frequency-division multiplexing (OFDM) symbols, while the transmission of the whole codeword takes one millisecond. With WiMAX, the codeword may be transmitted within a frame that has a duration of 20 milliseconds. The channel information CI may be used by the base station 15 for link adaptation of transmissions over the downlink radio channel 33. The terminal 13 determines the channel information CI depending on a measured channel quality of the downlink radio channel 33 and communicates the channel information CI to the base station 15. Then the base station 15 may adapt the downlink transmission e.g. by selecting a precoding matrix according to the PMI received from the terminal 13 and/or selecting a modulation and/or coding scheme depending on the CQI received from the terminal 13. Transmitting channel information is particularly effective in systems where characteristics of the uplink radio channel 29 and the downlink radio channel 33 differ from each other, such as systems using Frequency Division Multiplexing (FDD). However, the present invention is not limited to FDD systems; it can also be used in connection with systems using Time Division Duplexing (TDD) under non-reciprocal channel conditions. Even with TDD or other duplexing schemes such conditions may be caused by fast fading or by interference.

In an embodiment, the signal s and the codeword c comprise the channel information CI only, i.e. only the channel information CI is encoded by the encoder 19. In another embodiment, a data sequence d is transmitted over the transmission line 31 together with the channel information CI. In this embodiment, the encoder 19 not only encodes the channel information CI but also the data sequence d. As a result, the signal s and the codeword c comprise both channel information CI and payload data represented by the data sequence d. In this embodiment, the decoder 27 regenerates the channel information CI' and the data sequence d'.

FIG. 2 shows a first preferred embodiment of the transmission line 31 in more detail. The transmission line 31 has a transmitter element 35 comprising the encoder 19. The encoder 19 comprises a prioritizing element 37 and a mapper 39. Furthermore, the transmission line 31 has a receiver element 41 comprising the decoder 27. The uplink radio channel 29 is arranged between the transmitter element 35 and the receiver element 41. In this embodiment, the channel information CI corresponding to the downlink channel is transmitted in uplink direction, i.e. over the uplink radio channel 29, because many wireless networks require that the channel information CI be transmitted from the terminal 13 to the base station 15. However, in another embodiment, the transmission is performed in the downlink direction, i.e. the downlink radio channel 33 is arranged between the transmitter element 35 and the receiver element 41 in order to characterize the uplink channel. In the shown embodiment, the transmitter element 35 is a part of the terminal 13 and the receiver element 41 is a part of the base station 15. In another embodiment, the base station 30 comprises the transmitter element 35 and the terminal comprises the receiver element 41.

When operating the transmission line 31, the channel information CI is subdivided into multiple parts $ci_1$, $ci_2$ of channel information. The individual parts $ci_1$, $ci_2$ are fed into the prioritizing element 37. The prioritizing element 37 classifies the channel information CI by assigning coding level $0, \ldots, n$ of a multi-level code to them. The coding levels $0, \ldots, n$ are assigned to the parts $ci_1$, $ci_2$ according to an importance of these parts $ci_1$, $ci_2$ for the link adaptation performed by the base station 15. For each coding level $0, \ldots, n$, the prioritizing element 37, generates a bit sequence $c_1, c_2, \ldots, c_n$. Each generated bit sequence $c_1, c_2, \ldots, c_n$ corresponds to the part $ci_1$, $ci_2$ of channel information CI to which the coding level of that bit sequence $c_1, c_2, \ldots, c_n$ has been assigned. Each coding-level $0, \ldots, n$ corresponds to a detection probability level $p_1, p_2, \ldots, p_n$. In the shown embodiment, a part $ci_i$, $i=1, n$ of channel information CI having a given index i has a higher detection probability level $p_i$ than any other part $p_j$ with $j>i$. If $p_i$ is the detection probability level of the bit sequence $c_i$, then the condition $p_i>p_2> \ldots >p_n$ holds.

In an embodiment, the channel information CI may be subdivided such that part $ci_i$ is more important with respect to link adaptation than part $ci_j$ if and only if $i<j$. In this embodiment, the coding level i may be assigned to the part $ci_i$ such that the part $ci_i$ corresponds to the bit sequence $c_i$.

The mapper 39 maps the bit sequences $c_1, c_2, \ldots, c_n$ of channel information CI to modulation symbols such that the above-mentioned condition regarding the detection probability levels $p_1, p_2, \ldots, p_n$ holds. Thereby, the mapper 39 generates mapping information m, e.g. a mapping table. A radio signal is generated depending on the mapping information m and transmitted over the uplink radio channel 29 to the receiving element 41.

The decoder 27 decodes the received signal and regenerates the bit sequences $c_1, c_2, \ldots, c_n$ and the parts $ci_1$, $ci_2$ of the channel information CI. The regenerated bit sequences are referred to as $c'_1, c'_2, c'_n$. In case of transmission errors, the decoder 27 may not be able to regenerate the bit sequences $c_1, c_2, \ldots, c_n$ of channel information CI correctly. The probability that a certain bit sequence $c_i$ is regenerated correctly, $c_i=c'_i$, is characterized by the detection probability level $p_i$ of that bit sequence $c_i$ of channel information CI. In the shown embodiment the bit sequence $c_1$ is therefore transmitted more reliably than the other bit sequences $c_2, \ldots, c_n$. Therefore, the prioritizing element 37 is configured such that the bit sequences $c_1, c_2, \ldots, c_n$ having a low index $i=1, \ldots, n$ comprise more important parts $ci_1$, $ci_2$ channel information CI than those bit sequences $c_1, c_2, \ldots, c_n$ which have a rather high index $j<i$. This has the effect that the important parts of the channel information CI are regenerated quite reliably by the decoder 27 and thus the probability of transmission errors can be kept low for those important parts of the CI, even in the presence of fading, noise and interference.

As a consequence, the performance of link adaptation is not heavily degraded in case of strong noise and/or heavy interference during the transmission of CI via the uplink radio channel 29. Because merely the important parts of the channel information CI have a high detection probability level and the remaining parts have a comparatively low detection probability level, the channel information CI is transmitted efficiently, i.e. with low consumption of radio transmission resources of the uplink radio channel 29.

Figure 3:
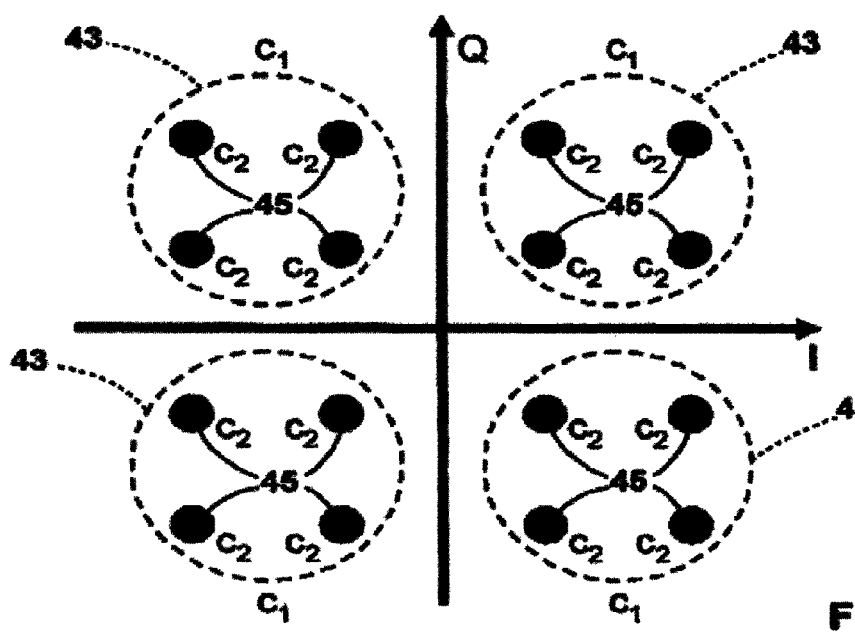
FIG. 3 shows a 16-QAM constellation of a hierarchical modulation scheme.

FIG. 3 shows an exemplary mapping of two bit sequences c1, c2 to a 16-QAM symbol constellation using hierarchical modulation. In FIG. 3, hierarchical modulation with two coding levels is used. However, the present invention is neither limited to hierarchical modulation being a special type of multi-level coding nor to a certain number of coding levels. The present invention may be applied with any type of multi-level Forward-Error-Correction (FEC) code.

A first bit sequence $c_1$ having the highest priority is mapped to outer symbols 43 of the hierarchical modulation scheme. A second bit sequence $c_2$ having a low priority is mapped to inner symbols 45. In another embodiment, more than two hierarchy levels of the hierarchical modulation is used and more than two bit sequences $c_1$, $c_2$ may be provided.

In the first embodiment, a high priority having a high detection probability level is assigned to wideband channel information about the downlink radio channel 33. The wideband information is, thus, a first part $ci_1$ of the channel information CI. The wideband information is related to the whole radio channel. A lower priority having a lower detection probability level is assigned to sub-band information that is specific to a certain sub-band of that radio channel. That is, the sub-band information is a second part $ci_2$ of the channel information CI. The channel information may comprise a Precoding Matrix Indicator (PMI) and/or a Channel Quality Indicator (CQI). Both the PMI and the CQI may be related to the whole channel (wideband PMI, wideband CQI) or to a certain sub-band of the channel (sub-band PMI, sub-band CQI). An exemplary mapping of these parts of the channel information CI to the bit sequences is shown in the table below.

| part of CI | bit sequence | detection probability level | PMI | CQI |
| --- | --- | --- | --- | --- |
| $ci_1$ | $c_1$ | $p_1$ (high) | wideband PMI | wideband CQI |
| $ci_2$ | $c_2$ | $p_2$ (low) | sub-band PMI | sub-band CQI |

In an embodiment, link adaptation in the form of closed-loop Multiple Input Multiple Output (MIMO) is performed for downlink transmissions over the downlink radio channel 33. For correct closed-loop MIMO operation it is important to know a preferred precoding weight at least for the whole frequency band (i.e. wideband PMI), giving some rough information on the radio channel 33. Additionally, channel quality information, at least averaged over the whole band (wideband CQI) may be transmitted in order to allow the base station 15 to select an appropriate modulation and coding scheme and to decide on scheduling priorities. As this wideband information represents the minimum amount of required information for performing closed-loop MIMO, the wideband information is transmitted with a high detection probability level over the uplink radio channel 29. When using hierarchical modulation as shown in FIG. 3, this kind of information may be mapped to the outer symbol hierarchy (outer symbols 43).

The refinement of the wideband information may be used for frequency selective optimization of the MIMO transmission. This refinement is transmitted using the lower coding-level corresponding to a lower detection probability level. When using LTE, radio transmission resources are grouped into time-frequency blocks, so called Physical Resource Blocks (PRBs). A set of the consecutive PRBs corresponds to a sub-band of the downlink radio channel 33. The sub-band PMI and/or the sub-band CQI may give additional information about the downlink radio channel 33 related to one or more sub-bands, i.e. one or more sets of PRBs. The sub-band information being less important refining information is preferably transmitted in the inner symbol hierarchy (inner symbols 45) when using hierarchical modulation. This sub-band information (sub-band PMI, sub-band CQI) may be represented as differential information (delta-CQI, delta-PMI) indicating a difference with respect to the wideband information.

According to a second exemplary embodiment, the channel information CI may comprise at least one PMI in the form of an index of a precoding vector stored in a predefined codebook. The coding-levels may be assigned to coarse-grained and fine-grained precoding vectors, respectively. As shown in the table below, an index to a vector stored in a coarse codebook may be assigned to a coding-level having a high detection probability level. A coding level having a lower detection probability may be used for transmission of refinement information which may be relative to the coarse codebook.

| part of CI | bit sequence | detection probability level | precoding information (PMI) |
|---|---|---|---|
| $ci_1$ | $c_1$ | $p_1$ (high) | coarse precoding vector |
| $ci_2$ | $c_2$ | $p_2$ (low) | refinement information, relative to coarse precoding vector |

Figure 4:
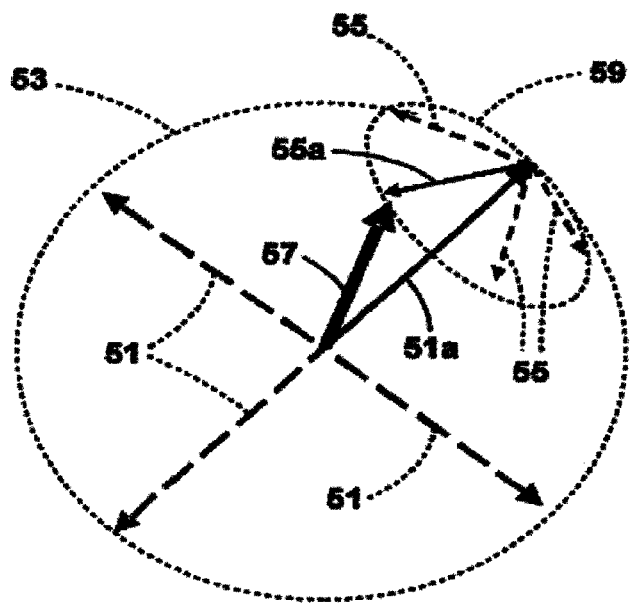
FIG. 4 shows a diagram of coarse precoding vectors and differential refining vectors.

This approach is illustrated in FIG. 4. The diagram of FIG. 4 shows a vector space of precoding vectors. Coarse precoding vectors 51 stored in a coarse codebook span a first complex hypersphere 53. Usually, these codebook vectors represent points on the complex hypersphere. The coarse codebook can be formed by Grasmannian line packings on the complex hypersphere 53. In the shown embodiment, the coarse codebook has four precoding vectors 51. Thus, the PMI transmitted with a detection probability comprises two bits to identify one of these four coarse precoding vectors 51. In FIG. 4, the coarse precoding vector 51a has been selected by the PMI transmitted over the transmission line 31.

Refinement information transmitted using the coding-level having a lower detection probability characterizes a differential vector 55 that may be used to determine a resulting precoding vector 57 depending on the selected coarse precoding vector 51a. In the shown embodiment, multi-differential vectors 55 may be stored in a refining codebook and the refining information may comprise an index to one of these differential vectors 55. As shown in FIG. 4, the differential vectors 55 refine the coarse codebook, e.g. by pointing to values at the border or inside a spherical cap 59 around each individual coarse precoding vector.

In the shown embodiment, four differential vectors 55 are stored in the refining codebook. Thus, the refining information comprises two bits for selecting one of these differential vectors 55 as a selected differential vector 55a. The resulting precoding vector 57 is determined depending on the selected coarse precoding vector 51a and the selected differential vector 55a, e.g. by adding the selected coarse precoding vector 51a and the selected differential vector 55a.

In case of transmission errors, the decoder 27 may not be able to decode the refining information for selecting a differential vector 55. However, the coarse information, having a high detection probability, can be decoded anyway. Therefore link adaptation may be performed based on the coarse information represented by the selected coarse precoding vector 51a. Refining information is optional in the sense that link adaptation is still working comparatively good when relying merely on the coarse information. When using hierarchical modulation, the bit sequence $c_1$ corresponding to the coarse precoding vector information may be mapped to the outer symbols 43 and the bit sequence $c_2$ corresponding to refinement information may be mapped to the inner symbols 45 (cf. FIG. 3).

In another embodiment, more than four coding-levels are used. In particular, an additional hierarchy-level may be added to refine the precoding vector 57 even further.

According to a third embodiment, the channel information CI is combined with a data sequence d (cf. FIG. 2). According to an exemplary assignment of the coding-levels to the data sequence d and the channel information CI shown below, an index to a coarse precoding vector 51 of a coarse codebook and the data sequence d are transmitted simultaneously using the encoder 19. A coding level having a high detection probability level $p_1$ is assigned to the channel information (e.g. the coarse precoding vector). A coding level having a low detection probability level $p_2 < p_1$ is assigned to the payload sequence d.

| part of information | bit sequence | detection probability level | content |
|---|---|---|---|
| $ci_1$ | $c_1$ | $p_1$ (high) | coarse precoding vector |
| d | $c_2$ | $p_2$ (low) | payload |

When using hierarchical modulation, the bit sequence $c_1$ corresponding to the coarse precoding vector information may be mapped to the outer symbols 43 and the bit sequence $c_2$ corresponding to the payload sequence d may be mapped to the inner symbols 45 (cf. FIG. 3). This mapping may be reversed when CI is less important than data, e.g. when the wireless channel is temporally not stable and accurate CI measurements are not likely. In these cases, d is mapped to $c_1$ and $ci_1$ to $c_2$. Even an adaptation between alternative mappings is possible if the channel stability changes, e.g. a moving user slows down, thus, getting a temporally more stable channel.

In an embodiment, the assignment of coding levels to the bit sequences $c_1$, $c_2$ shown above may be reversed dynamically when data transmission over the uplink radio channel 31 is more important than a performance of link adaptation of the downlink radio channel 33. By repeatedly or periodically switching these two mappings, the channel information CI and the data sequence d may be prioritized dynamically while operating the transmission line 31. For instance, a framing scheme may be established, with the mapping shown in the table above is used occasionally to provide accurate channel information CI, while it is reversed for most of the transmission time in order to prioritize the transmission of the data sequence d.

Transmitting the channel information CI and the data sequence d simultaneously using the same encoder 19 allows to regenerate the channel information CI and the data sequence d from one codeword received by the decoder 27 at the same time. Such simultaneous reception reduces a latency of the transmission of the channel information CI. As a consequence, the risk of faulty link adaptation due to the use of channel information CI that is outdated because of time-variant shadowing, fading, and/or interference of the downlink channel 29 is reduced.

For the sake of simple illustration, the above embodiments use two coding-levels only. The hierarchical modulation is an exemplary type of multi-level coding. In other embodiments, more than two coding-levels are used and other types of multi-level coding, in particular multi-level forward-error-correction codes (FEC-codes), are applied. Furthermore, the above-described embodiments may be combined with each other. For instance, when using three levels, an index to a coarse precoding vector 51, an index to a differential vector 55, and the data sequence d may be transmitted simultaneously. The data sequence d may also be transmitted simultaneously with the wideband PMI, with the wideband CQI, with the sub-band PMI, and/or with the sub-band CQI. Furthermore, wideband information, sub-band information, an index to a coarse precoding vector 51, and/or refinement information relative to the coarse precoding vector 51 may be transmitted simultaneously using different coding levels.

To sum up, using multi-level coding allows for reliably transmit important parts of the channel information and transmit refining channel information CI with little additional overhead. Moreover, it enables to dynamically adapt the detection probability of different parts of CI to the current channel situation. The refining information and/or the sub-band information may be embedded in the symbol and/or code space for transmitting the wideband information and/or the coarse information so that no additional multiple access resources in the uplink must be allocated by a scheduler of the base station 13. Switching between different modes for reporting the channel information, e.g. switching between different mappings of the parts $c_1$, $c_2$, . . . , $c_n$ of channel information CI and the data sequence d to the coding levels may be performed without additional control signaling. Furthermore, the refined channel information (sub-band information and/or refining information) can be transmitted without an additional delay reducing the overall latency of the link adaptation. Therefore, channel information may be transmitted more accurately and/or reliably by using multi-level coding.

The functions of the various elements shown in the Figures, including any functional blocks labelled as 'processors', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term 'processor' or 'controller' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method of transmitting channel information for link adaptation of a radio channel in a wireless network, the method comprising:
    encoding the channel information using multi-level coding, said multi-level coding comprising combining multiple bit sequences, each bit sequence corresponding to a coding level of said multi-level coding; and
    assigning one of said coding levels to at least a part of the channel information such that the at least a part of the channel information corresponds to the bit sequence of that coding level;
    wherein the method comprises subdividing the channel information into multiple parts of channel information according to an importance of parts of channel information for the link adaptation and assigning one of said coding levels to at least one part of said multiple parts.

2. The method according to claim 1, wherein the method comprises assigning multiple coding levels to multiple parts of the channel information, a detection probability of the coding level assigned to at least one of said multiple parts being higher than the detection probability of the coding level assigned to any further part of said multiple parts having a lower importance with respect to link adaptation than said at least one part.

3. The method according to claim 1, wherein the at least one coding level is assigned dynamically to the at least one part of channel information according to a momentary importance of parts of channel information in the link adaptation.

4. The method according to claim 1, wherein a first part of said multiple parts of channel information comprises wideband information related to the whole radio channel and a second part of said multiple parts of channel information comprises sub-band information related to at least one sub-band of the radio channel, the first part having a higher importance with respect to the link adaptation than the second part.

5. The method according to claim 1, wherein the channel information comprises coarse information, preferably coarse precoding vector information characterising a coarse precoding vector, and refining information for refining the coarse information, preferably refining precoding information for determining a fine-grained precoding vector based on the coarse precoding vector, the coarse information corresponding to a part of said multiple parts of channel information that has a higher importance than a further part of said multiple parts corresponding to the refining information.

6. The method according to claim 1, wherein the method comprises transmitting payload data using said multi-level coding and assigning different coding levels to the payload data and to the at least a part of the channel information.

7. The method according to claim 6, wherein the coding levels are assigned dynamically to the payload data and to the at least a part of the channel information.

8. A method of receiving channel information for link adaptation of a radio channel of a wireless network, the method comprising:
  decoding the channel information using multi-level decoding, said multi-level decoding comprising detecting multiple bit sequences, each bit sequence corresponding to a coding level of said multi-level decoding; and
  determining at least a part of the channel information depending on the bit sequence corresponding to a predefined coding level;
  wherein the channel information is subdivided into multiple parts of channel information according to an importance of parts of channel information for the link adaptation and wherein a first part of said multiple parts of channel information comprises wideband information related to the whole radio channel and a second part of said multiple parts of channel information comprises sub-band information related to one or more sub-bands of the radio channel, the first part having a higher importance with respect to link adaptation than the second part.

9. The method according to claim 8, wherein the channel information is subdivided into multiple parts of channel information according to an importance of these-parts of channel information for the link adaptation and wherein the channel information comprises coarse information, preferably coarse precoding vector information characterising a coarse precoding vector, and refining information for refining the coarse information, preferably refining precoding information for determining a fine-grained precoding vector based on the coarse precoding vector, the coarse information corresponding to a part of said multiple parts of channel information that has a higher importance than a further part of said multiple parts corresponding to the refining information.

10. The method according to claim 8, wherein the method comprises receiving payload data using said multi-level decoding, different coding levels being assigned to the payload data (d) and to the at least one part of the channel information.

11. A transmitting device including:
  A memory with executable instructions stored thereon; and
  A processor configured to access said memory to execute said executable instructions and to:
    encode the channel information using multi-level coding, said multi-level coding comprising combining multiple bit sequences, each bit sequence corresponding to a coding level of said multi-level coding; and
    assign one of said coding levels to at least a part of the channel information such that the at least a part of the channel information corresponds to the bit sequence of that coding level;
  wherein the transmitting device is further configured to subdivide the channel information into multiple parts of channel information according to an importance of parts of channel information for the link adaptation and assign one of said coding levels to at least one part of said multiple parts.

12. A receiving device including:
  A memory with executable instructions stored thereon; and
  A processor configured to access said memory to execute said executable instructions and to:
    decode the channel information using multi-level decoding, said multi-level decoding comprising detecting multiple bit sequences, each bit sequence corresponding to a coding level of said multi-level decoding; and
    determine at least a part of the channel information depending on the bit sequence corresponding to a predefined coding level;
  wherein the channel information is subdivided into multiple parts of channel information according to an importance of parts of channel information for the link adaptation and wherein a first part of said multiple parts of channel information comprises wideband information related to the whole radio channel and a second part of said multiple parts of channel information comprises sub-band information related to one or more sub-bands of the radio channel, the first part having a higher importance with respect to link adaptation than the second part.

* * * * *